No. 778,954. PATENTED JAN. 3, 1905.
J. J. DUBÉ.
COMBINED GARBAGE BURNER AND WATER HEATER.
APPLICATION FILED JUNE 22, 1903.
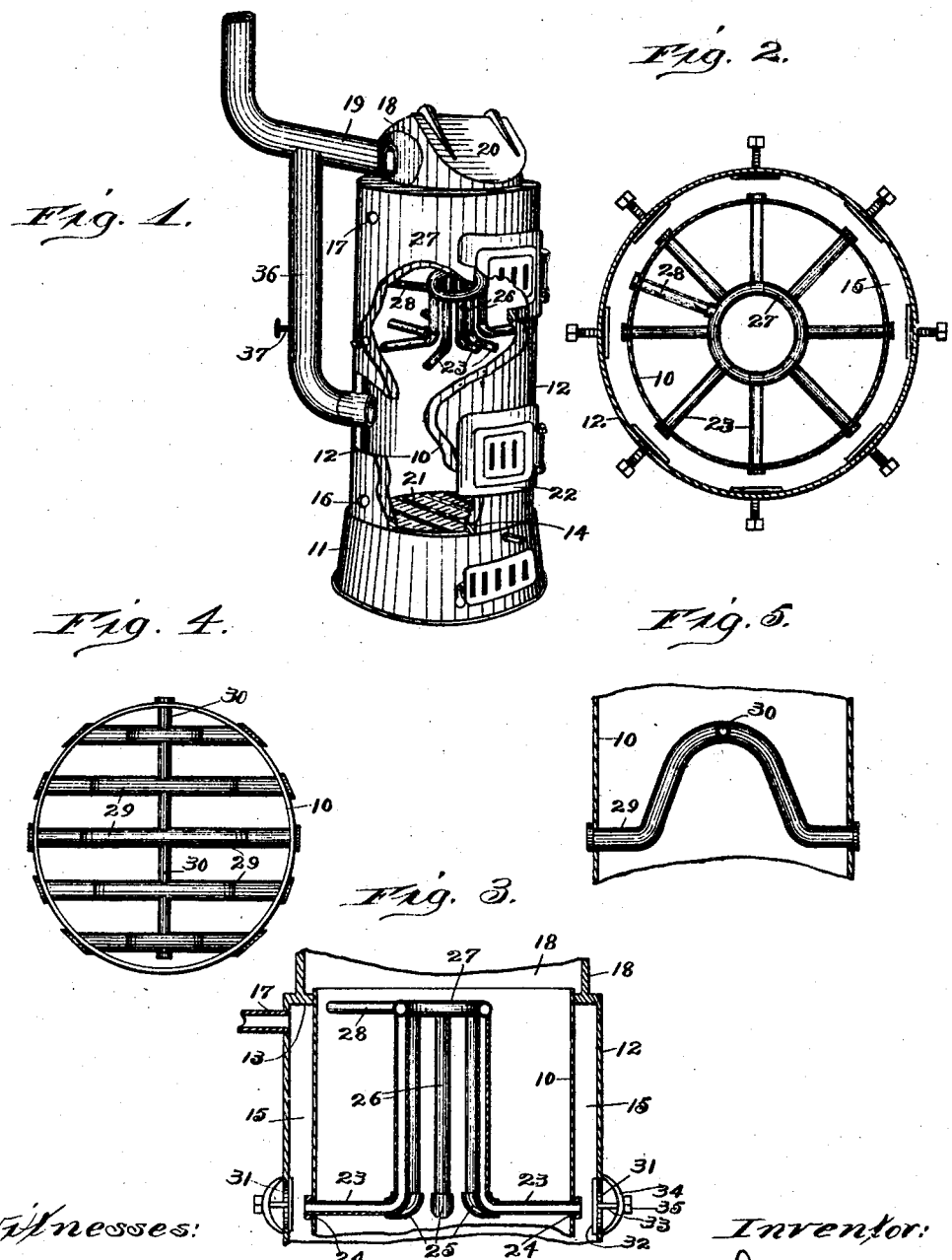

No. 778,954.   Patented January 3, 1905.

UNITED STATES PATENT OFFICE.

JOHN J. DUBÉ, OF CHICAGO, ILLINOIS.

COMBINED GARBAGE-BURNER AND WATER-HEATER.

SPECIFICATION forming part of Letters Patent No. 778,954, dated January 3, 1905.

Application filed June 22, 1903. Serial No. 162,471.

*To all whom it may concern:*

Be it known that I, JOHN J. DUBÉ, a citizen of the United States, residing at Chicago, in the county of Cook and State of Illinois, have invented certain new and useful Improvements in a Combined Garbage-Burner and Water-Heater, of which the following is a specification.

This invention relates to improvements in apparatus to be used for consuming garbage and other refuse matter and at the same time for heating water; and it consists in certain peculiarities of the construction, novel arrangement, and operation of the various parts thereof, as will be hereinafter more fully set forth and specifically claimed.

The principal object of my invention is to so construct the apparatus as to effect the thorough burning or the consumption of the garbage and refuse matter and to utilize the heat generated thereby and from its gases in heating a supply of water.

Another object is to provide a support or grate for the garbage, which shall be composed of tubes or pipes arranged so that water may pass through and circulate therein.

A further object is to so construct the apparatus as to prevent the smoldering of the fire on the lower grate by reason of the drippings from the garbage, which is supported about the middle portion of the burner or furnace.

Other objects and advantages of the invention will be disclosed in the subjoined description and explanation.

In order to enable others skilled in the art to which my invention pertains to make use of the same, I will now proceed to describe it, referring to the accompanying drawings, in which—

Figure 1 is a perspective view of a combined garbage-burner and water-heater embodying one form of my invention, showing the inner and outer cylinders comprising the furnace and water-jacket therefor broken away to disclose the construction and arrangement of the support for the garbage. Fig. 2 is a longitudinal section of the apparatus. Fig. 3 is a vertical sectional view through a portion of the burner or furnace and the garbage-support. Fig. 4 is a plan view of the inner cylinder of the furnace, showing a modification in the construction of the garbage-support; and Fig. 5 is a fragmental view, partly in section and partly in elevation, of the inner cylinder and the garbage-support, showing a modification in the latter.

Like numerals of reference refer to corresponding parts throughout the different views of the drawings.

The reference-numeral 10 represents the inner casing, which is preferably cylindrical in form, as shown, but may be of other shape, and rests at its lower end on a base 11 of any suitable size, form, and material. Surrounding the inner casing 10 is an outer casing or water-jacket 12, which is held at a distance from the inner casing by means of flanges 13 and 14, located between the casings at their top and bottom, respectively, thus forming a chamber or space 15, to which water is supplied through an inlet-opening 16, located in the lower portion of the water-jacket, and from whence the water may be discharged through the outlet-opening 17 in the upper portion of said jacket or outer casing. Located on the upper surface of the flange 13 is a hood 18, with which communicates a pipe 19, leading to a flue for the escape of smoke and gases. This hood is provided with a doorway 20, through which the garbage may be placed into the inner casing, so as to rest on the garbage grate or support. The lower portion of the inner casing is provided with a horizontal grate 21 of any suitable form, and just above said grate the inner and outer casings forming the furnace are provided with a doorway 22, through which fuel may be passed to the said grate. At a suitable distance above the grate 21 the inner casing is provided with a garbage grate or support which comprises a series of tubes 23, which have their outer ends expanded or otherwise suitably secured in openings 24 in the inner casing. The tubes 23 are arranged radially, as shown in Figs. 1 to 3, inclusive, and have their inner ends upturned and approximated. Secured to the inner end of each of the tubes 23 by means of an elbow-coupling 25 is an upright tube or pipe 26, which are secured to and communicate with a circular tube 27, located horizontally on the tops of the upright tubes. Leading from the circular tube 27 and communicating with the water-space 15 is a tube 28, which will permit of the free circulation of water through the tubes comprising the garbage grate or support, as is evident.

In Figs. 4 and 5 I have shown a modification in the construction of the garbage grate or support, which consists of a series of tubes 29, located parallel with one another and each having its ends secured in suitable openings in the inner casing 10, so as to communicate with the space 15 between the said casing and the outer one. These tubes are bent upwardly at their central portions, as shown in Fig. 5, and are united by means of pipes 30, one of which extends through the casing 10 and communicates with the water-space, as will be understood by reference to Fig. 4 of the drawings, thus affording means for the circulation of water through the tubes 29, comprising the modified form of the garbage grate or support.

In order to permit of access to the horizontal portions of the tubes forming the garbage-grate, the outer cylinder or casing 12 may be provided, as shown in Figs. 2 and 3 of the drawings, with a series of openings 31, located at points opposite the outer ends of the said tubes. Located in each of the openings 31 is a hand-plate 32, each of which is provided with a screw-threaded bolt 33, which passes through a yoke 34, having its ends resting against the outer surface of the water-jacket or outer casing. On the outer end of each of the bolts 33 is a nut 35, used for securing the plates 32 in position.

Communicating with the cavity of the inner casing or cylinder below the garbage grate or support is an auxiliary pipe or flue 36, which may communicate at its upper end with the smoke-pipe 19 and is employed for the discharge of smoke and gases from the fire on the grate 21 and also to prevent the fire on said grate smoldering on account of the drippings from the garbage, which rests on the garbage grate or support.

By constructing the garbage grate or support with its central portion upwardly projected it is apparent that the horizontal portions of the tubes will hold the garbage or refuse matter in such a manner as to permit of the passage of the flames, heat, and smoke from the lower grate 21 through the central portion of the mass supported on the garbage-grate.

As the garbage will contain more or less moisture or liquid, it is evident that the same will pass between the tubes comprising the garbage-grate and fall on the fire of the lower grate and will have a tendency to extinguish the same by reason of the smoke and steam caused thereby, which may be in sufficient quantities to prevent it passing readily through the flue 19 and the draft-passage formed by the upward projections of the garbage-grate tubes. To facilitate the discharge of the smoke and gases from the lower portion of the furnace, I employ the auxiliary pipe 36, which may be provided with a damper 37 to regulate the draft therethrough.

Having thus fully described my invention, what I claim as new, and desire to secure by Letters Patent, is—

1. In a combined garbage-burner and water-heater, the combination with an inner casing, of an outer casing surrounding the same at a distance therefrom to form a space for the circulation of water, a water-supply pipe and a discharge-pipe communicating with said space, a garbage-grate comprising a series of tubes horizontally and radially arranged and having their outer ends secured in openings in the inner casing and communicating with the water-space, vertical tubes connected to and in communication with the inner ends of the horizontal tubes, a circular tube horizontally located and communicating with the upper portion of the vertical tubes, and a tube leading from the circular tube to the water-space, substantially as described.

2. In a combined garbage-burner and water-heater, the combination with an inner casing, of an outer casing surrounding the same at a distance therefrom to form a space for the circulation of water, a water-supply pipe and a discharge-pipe communicating with said space, a garbage-grate comprising a series of tubes horizontally and radially arranged and having their outer ends secured in openings in the inner casing and communicating with the water-space, vertical tubes connected to and in communication with the inner ends of the horizontal tubes, a tube communicating with the upper portion of the vertical tubes and with the water-space, a smoke-discharge pipe communicating with the upper portion of the inner casing and an auxiliary smoke-discharge pipe communicating with the cavity of the inner casing below the garbage-grate, substantially as described.

JOHN J. DUBÉ.

Witnesses:
   CHAS. C. TILLMAN,
   A. GUSTAFSON.